Nov. 1, 1949.  L. WHITE, JR  2,486,622
PHOTOELECTRIC APPARATUS FOR DETERMINING THE
PHYSICAL PROPERTIES OF SUBSTANCES BY
ALTERNATING EXPOSURE TO LIGHT
Filed Oct. 30, 1947  2 Sheets—Sheet 1

INVENTOR.
Locke White, Jr.
BY
Henry L. Jennings
Attorney

Patented Nov. 1, 1949

2,486,622

UNITED STATES PATENT OFFICE 2,486,622

PHOTOELECTRIC APPARATUS FOR DETERMINING THE PHYSICAL PROPERTIES OF SUBSTANCES BY ALTERNATING EXPOSURE TO LIGHT

Locke White, Jr., Birmingham, Ala., assignor to Southern Research Institute, a corporation of Alabama Application October 30, 1947, Serial No. 783,065

1 Claim. (Cl. 88—14)

My present invention relates to apparatus for determining accurately the physical properties of substances, such for example, as the concentration of dust or smoke present in a sample of gas, the variation in intensity of color between a sample of gas or fluid and a standard sample, or in the percentage of a given constituent in a sample as compared with the percentage of the same in a standard or reference sample.

Heretofore, in the art to which my invention relates, methods and apparatus have been proposed for measuring the specific properties of substances, such for example as the concentration of smoke in a sample of gas,, wherein a sample of the smoke-carrying gas was placed in a closed chamber, into which chamber was directed a beam of light. A light sensitive, electric signal producing device, such as a photo-electric cell, placed adjacent a transparent window of the chamber, was energized by the light reflected from the sample in the chamber. The current induced in the photo-electric cell was used to energize a suitable instrument such as a galvanometer, and to obtain a reading of the light reflected by the sample. The principle upon which these methods and apparatus depend for their operation is that the amount of light striking the photo-cell by reflection from the sample of material in the chamber varies with the composition of the sample. However, there is always present an error-producing factor in these methods and apparatus which adversely affects the accuracy of the measurement obtained. and which insofar as I am aware, has not heretofore been entirely eliminated. This factor is the amount of light reflected to the photo-cell by the walls or optical system of the apparatus itself, often called stray light. Its effect on the photo-cell, in prior methods and apparatus, is cumulative with the light striking the same from the sample, so that the measurement obtained does not represent solely the light reflective property of the sample. Under some conditions this error is further magnified by the fact that the instantaneous intensity of the exciter light source may vary. Efforts heretofore made to eliminate this error have consisted principally in improving the optical system of the apparatus. While progress in this direction has been made, the best methods and apparatus with which I am familiar have not produced entirely satisfactory results.

Another type of apparatus heretofore proposed for determining the properties of substances is the well known spectrometer which depends for its operation upon the light absorbing properties of the substance being tested. In one form of this apparatus a source of energy, frequently an incandescent unit, passes infra-red rays through a sample of the material being tested and thence onto a thermocouple. The electric signal thus produced in the thermocouple is measured, thereby giving an indication of the infrared absorption properties of the substance. The reading thus obtained is not entirely accurate since the thermocouple is affected by stray radiations from parts of the apparatus. These radiations have heretofore adversely affected the accuracy of the device in much the same way as stray light affects penetrometers, as already mentioned.

Still another type of apparatus heretofore used to determine physical properties of substances is the colorimeter. This apparatus has not heretofore been entirely accurate due to variations in the intensity of the light source.

It is a prime object of my invention, therefore, to provide apparatus for determining the physical properties of substances in which the determination is specific to the property of the sample under investigation, thereby eliminating the above mentioned inaccuracies.

Another object of my invention is to provide apparatus of the character designated in which samples of the substance to be examined and samples of a standard or reference substance are subjected alternately to a treatment which produces an electric signal, measurable through the medium of certain instrumentalities, and in which only the component of the signal so produced by the variations in properties between the two samples is utilized to obtain the measurement, thus making the measurement specific to the variations in properties of the samples, thereby eliminating many sources of errors.

A further object of my invention is to provide apparatus for determining the physical properties of substances in which samples of the substance whose properties are to be determined and a substance having known properties are subjected alternately and in timed regularity while in a confined space to a light source which produces alternating electric signals, which signals are mixed in point of time with the direct error producing signals developed by stray light in the apparatus itself, and then in separating the alternating signal from the direct signal and measuring only the former, thus eliminating the errors in measurement resulting from the signal produced by the stray light, thereby to obtain a measurement which is truly and solely a function of the difference in properties between the samples.

A still further object is to provide apparatus of the character designated in which the treatment to which the samples are subjected to produce the electric signals may embody the use of either visible or ultraviolet light, or infrared rays, thereby permitting in the first two cases the use of apparatus embodying photo-electric cells and in the latter case, apparatus embodying a thermocouple or bolometer.

A still further object is to provide apparatus of the character designated in which the electric signal is produced in the light sensitive device by subjecting samples of a known and an unknown substance alternately to a steady source of light or other form of energy capable of exciting the light sensitive device, and in impressing this signal onto an alternating current amplifier which is sensitive only to signals having a frequency corresponding to that at which the samples are alternately subjected to the light, thereby minimizing the effect of variations in the intensity of the light source as well as eliminating the effect produced by stray light.

Apparatus embodying features of my invention is illustrated in the accompanying drawing forming a part of this application in which—

Figure 1:
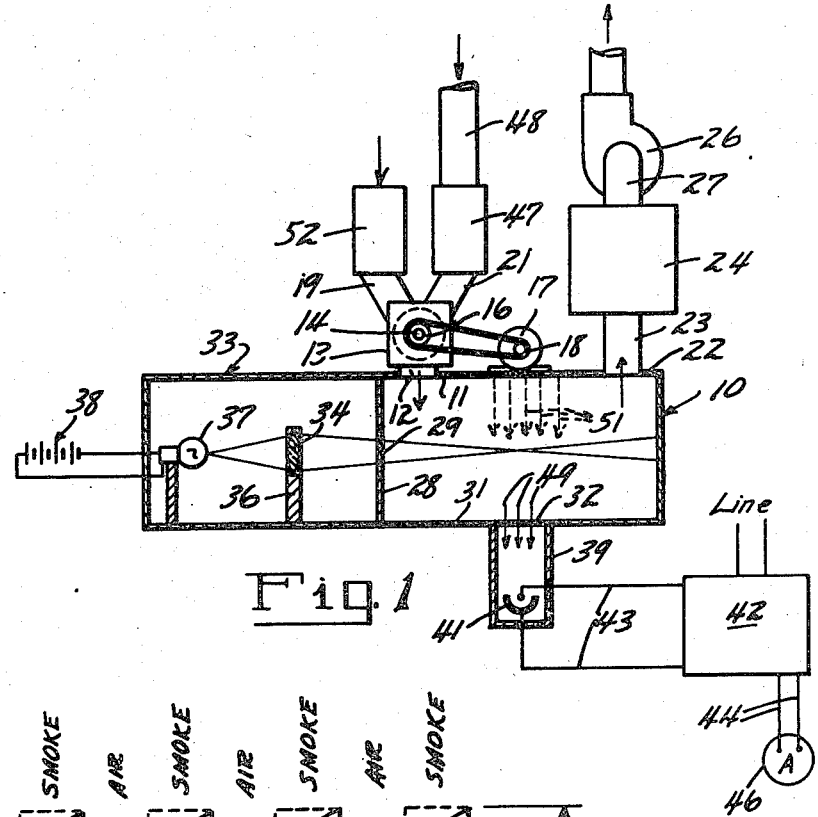
Fig. 1 is a somewhat diagrammatic sectional view illustrating apparatus set up as a smoke penetrometer to test the efficiency of a filter.

Referring now to the drawing for a better understanding of my invention, and more particularly to Fig. 1 thereof, I show a fluid tight light scattering chamber indicated generally by the numeral 10. Adjacent one end of the chamber 10 in one wall thereof, I provide an opening 11. Mounted in the opening 11 is one end of a conduit 12, connected at its other end to the discharge opening of a suitable valve, as for instance a three way rotary valve 13. The stem 14 of the valve is provided with a pulley 16 and the valve is rotated through the medium of a motor 17 and a belt 18. Leading from the intake openengs of the valve 13 are a pair of other conduits 19 and 21, the purpose of which will be explained later.

I provide another opening 22 in the same side of the chamber as the opening 11, adjacent the opposite end of the chamber. Secured in this opening is one end of a conduit 23 having its opposite end connected to a surge chamber 24. A vacuum pump 26 is connected to the chamber 24 by means of a conduit 27.

One end wall 28 of the chamber 10 is provided with a transparent window 29 and the side wall 31 of the chamber opposite the wall having the openings 11 and 22 therein is provided with a transparent window 32. Mounted in an extension housing 33 at the end of the chamber is a lens 34, supported in any suitable manner as by a holder 36. The lens 34 is positioned in front of the window 29 to pass into the chamber light received from an exciter lamp 37. The lamp 37 may be an ordinary incandescent lamp when the apparatus is used as a smoke penetrometer, or it may be an ultra-violet ray unit when the apparatus is used as a fluorimeter, and is energized from any suitable source, for instance, a battery 38.

Mounted in a housing 39 and disposed to receive light through the window 32 is a light sensitive, electric signal producing unit, such as a photo-electric cell 41. The photo-electric cell impresses signals onto the input side of an alternating current amplifier 42, through suitable circuits 43. Other circuits 44 lead from the output of the amplifier 42 to a suitable indicating instrument 46, which may be an ammeter. The amplifier 42 preferably is so constructed that it is sensitive only to signals having a frequency corresponding to the speed of rotation of the valve 13, for a reason which will appear later.

From the foregoing it will be apparent that the photo-electric cell 41 receives light from within the chamber 10 and that the electric signal therefrom is passed to the amplifier 42, is there amplified and passed to the ammeter 46. In a manner well understood, the intensity of the signal impressed upon the amplifier varies with the intensity of light striking the cell 41.

The operation of my invention so far described is as follows:

If, for example, the apparatus is to be used to test the efficiency of a smoke filter 47, the discharge opening of the same is placed in air tight connection with one of the intake conduits, for instance 21, of the valve 13, while the other intake opening of the valve is open to atmosphere. The intake opening of the filter is connected through a conduit 48 to a source of smoke, not shown. The lamp 37 is energized, the pump 26 is started, and a motor 17 is energized to commence regular and sequential connection of conduits 19 and 21 to chamber 10. As the valve 13 rotates, samples or batches of smoke and air are admitted alternately through conduits 19 and 21 to the chamber 10. The batches of air and smoke, therefore, are both penetrated by the light from the lens 34, and the photo-electric cell 41 is subjected to variable light intensities reflected by the samples, the reflected light being indicated by the arrows 49. At the same time, regardless of whether or not smoke or air is in the chamber 10, a certain amount of stray light also is being reflected onto the cell 41 from the walls of the chamber as indicated by the arrows 51. The exciter light source is substantially constant, thus producing a substantially constant effect on the photo cell 41 and causing the same to impress a direct, or non-pulsating signal, on the amplifier. However, should the intensity of the exciter lamp vary, it does so at a random frequency. The amplifier 42 is so constructed as not to be responsive to signals of random frequency, or to non-pulsating signals. Thus signals impressed thereon by the cell 41 and due solely to stray light are not passed by the amplifier. Accordingly, the component of the signal caused by stray light does not register on the ammeter 46. At the same time, the increase in reflection during the periods of time when the batches of smoke are in the chamber 10 causes an increase in the reflected light striking the cell 41, thus impressing on the amplifier an alternating or pulsating signal. As is well understood, the alternating current amplifier passes this type of signal and the same is indicated by ammeter 46. Therefore, the direct and random frequency components of the signal due to stray light which heretofore have resulted in erroneous readings, are eliminated, and only that portion of the signal due to the difference in the reflection of light by the smoke and the air is amplified and passed to the ammeter. Variations in the intensity of the light source affect this difference, but the resulting error is greatly reduced. The reading obtained on the ammeter is thus representative of the concentration of smoke in the chamber 10 as compared to air, and the efficiency of the filter 47 is indicated. If desired, a filter 52 known to have a high filtering efficiency may be connected to the conduit 19, thereby to assure that the batches of air entering the chamber are free of smoke.

Figure 2:
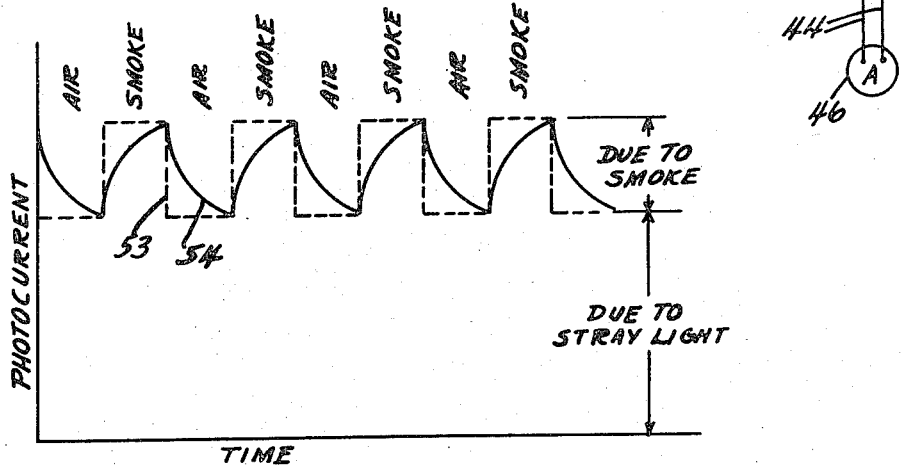
Fig. 2 is a diagram illustrating the relationship between the photo current and time.

Referring now to Fig. 2, I show the photo-current plotted against time, the chart illustrating the amount of current due to stray light and the amount of current due to smoke. The theoretical relationship between these two factors is indicated by the dotted line 53 which shows an instantaneous rise in photo-current up to the maximum, a holding of this maximum for the period of time during which smoke is in the chamber, and then an instantaneous drop back to the point of beginning as soon as the smoke leaves the chamber. However, due to the fact that the chamber is not instantaneously cleared of smoke by the vacuum pump 26, the actual relationship is more accurately indicated by the solid line 54, which shows the change of signal to be somewhat exponential. The accuracy of the reading obtained is largely unaffected because of the fact that the degree of substitution of air for smoke during each cycle is substantially constant due to the substantially constant speed of rotation of the valve 13 and the substantially constant pull of the vacuum pump 26. Therefore, complete exhaustion of smoke during each cycle of operation is not necessary in order to obtain accurate readings, it being sufficient if the degree of substitution of smoke for air is substantially constant. It will be apparent that the valve 13 may be driven by a constant speed motor so that it opens and closes regularly, and that the pump 26 may be caused to exert a substantially constant pull on the chamber 10.

Figure 3:
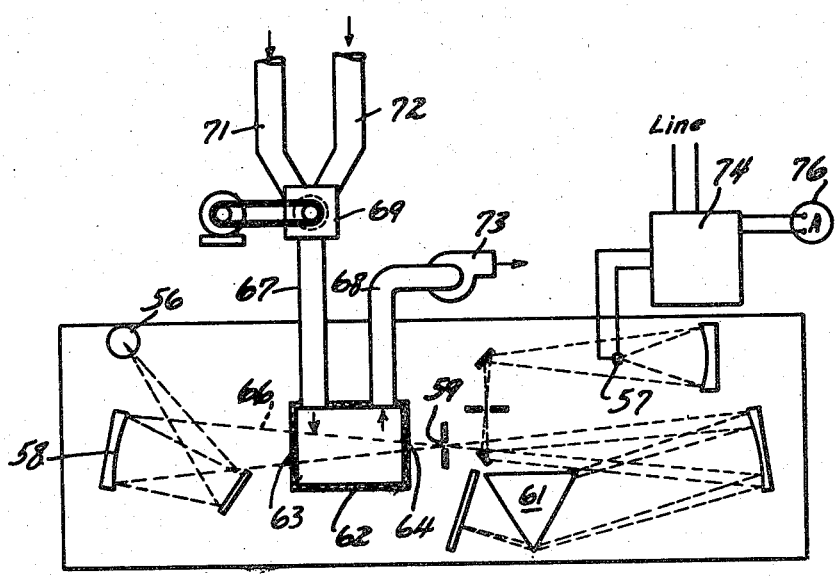
Fig. 3 is a diagrammatic partly sectional view showing my improved apparatus associated with an infrared spectrometer.

Referring now more particularly to Fig. 3 of the drawing, I have shown my improved apparatus associated with an infrared spectrometer of a well known standard make. In this modification I show the spectrometer as embodying an incandescent source 56 which, through an optical system energizes a thermocouple 57. In the type of spectrometer shown, radiations from the source 56 are focused by a mirror 58 on an entrance slit 59. From there the radiations pass through the system, including a prism 61, and finally reach the thermocouple 57.

I mount a gas tight chamber 62 between the mirror 58 and the slit 59 and provide the same with end walls 63 and 64 formed of suitable material to pass the radiations from the mirror 58, indicated by the lines 66. To an opening in the chamber 62 adjacent the wall 63 I secure a conduit 67, and adjacent wall 64 of the chamber, I secure a conduit 68. The conduit 67 leads to a three way, motor driven, rotary valve 69, similar in all respects to the valve 13 and having conduits 71 and 72 connected to the intake openings thereof. The conduit 68 leads to the intake side of a vacuum pump 73, similar to the pump 26.

The operation of the modification of my invention shown in Fig. 3 is substantially the same as that already described. If it is desired to obtain the difference between the physical properties of, for instance, two gases the same are introduced into the conduits 71 and 72. The valve 69 is rotated by means of its associated motor and batches of the two gases pass alternately into and out of the chamber 62. Radiations from the source 56 pass continually through the chamber 62 and the effect on the thermocouple 57 varies with the absorption characteristics of the gases. An amplifier 74 and an ammeter 76, similar to the amplifier 42 and the ammeter 46, pass and receive, respectively, only the alternating component of the current produced by the difference in infrared absorption characteristics of the materials, as evidenced by the degree of excitation of the thermocouple 57. The inaccuracies of the spectrometer due to the thermocouple receiving radiations from sources other than through the optical system are thus eliminated since any such radiations are substantially constant, and the ammeter 76 indicates only the difference in these properties between the two samples.

While in describing my invention in detail, I have shown the same as more particularly adapted for use in determining the relative properties of gases, it will be apparent that the same may be used to determine the specific physical properties of various substances. Likewise, my apparatus may be utilized to determine accurately the efficiency of devices such as filters; to control manufacturing processes wherein it is desired to produce a gas or liquid having the properties of a known or standard sample; or to obtain quantitative or qualitative analyses of substances by comparing the same with substances of known composition. It will further be apparent that my improved apparatus may be utilized in connection with other types of apparatus, for example, those used to measure electrical properties of solutions, such as their electromotive forces or conductivities. Likewise, it will be apparent that my apparatus may be used to test materials which absorb and emit light, as in fluorescence. Also, it will be apparent to those skilled in the art that the output signals from the amplifiers may be used to actuate devices other than indicating instruments such, for example, as control motors, valves and the like. In the specification and claim the word "light" is intended to include visible and invisible light, and other similar sources of energy which are effective to produce an electric signal in a light sensitive device. By "known and unknown" substances, I mean substances which are identical in terms of the effect on the measuring apparatus except in the one physical property under investigation.

From the foregoing, it will be apparent that I have devised an improved apparatus for determining the specific physical properties of substances which is both accurate and simple of operation, and which overcomes the specifically mentioned inaccuracies known to exist in prior apparatus. Efforts have been heretofore made to subject materials alternately to an identical force such as a light source, by dividing the light from the source and interrupting the same by means of a rotating sector. It will be obvious that such method does not result in subjecting the materials under test to an identical force, and that the results are not comparable in accuracy to those obtained by my improved apparatus.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claim.

What I claim is:

In an instrument for determining the relative concentration of smoke in two gases, a single fluid tight chamber, means to admit batches of said gases alternately to the chamber and in timed regularity, means to remove the samples alternately and in timed regularity from the chamber, a light source disposed to pass a beam of light into the chamber, a photoelectric cell disposed to receive light reflected from the gases and from the walls of said chamber thereby causing the photo electric cell to emit electric signals comprising alternating and direct components, an amplifier sensitive only to signals of a frequency corresponding substantially to the rate of alternation of the substances in said chamber and onto which all of said signals are impressed and disposed to pass only the alternating component thereof, and means to measure the output signals of the amplifier.

LOCKE WHITE, Jr.

REFERENCES CITED

The following references are of record in the file of this patent:

UNITED STATES PATENTS

| Number | Name | Date |
| --- | --- | --- |
| 1,746,525 | Darrah | Feb. 11, 1930 |
| 1,828,894 | Freygang | Oct. 27, 1931 |
| 2,119,326 | Grant | May 31, 1938 |
| 2,124,600 | Worrall | July 26, 1938 |
| 2,216,575 | Seinfeld et al. | Oct. 1, 1940 |

OTHER REFERENCES

"The Improved Penn. State Smokemeter," by P. H. Schweitzer, in Instruments, Sept. 1942, pages 346–350.